United States Patent Office 2,933,119
Patented Apr. 19, 1960

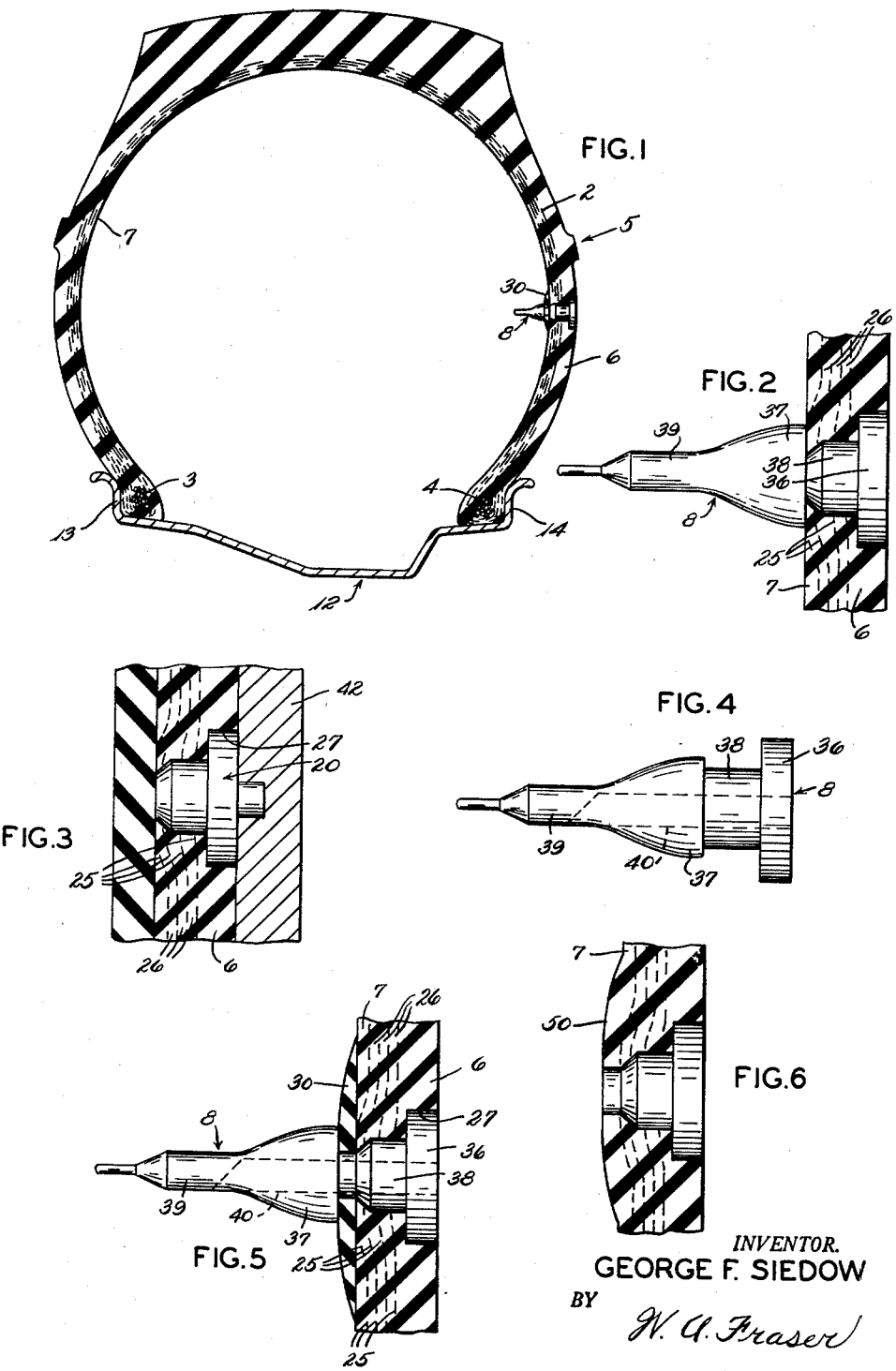

2,933,119

RUBBER VALVE

George F. Siedow, Akron, Ohio, assignor to The Firestone Tire & Rubber Company, Akron, Ohio, a corporation of Ohio Application March 11, 1958, Serial No. 720,644

4 Claims. (Cl. 152—429)

This invention relates to a tubeless tire adapted to be operated on a wheel rim without an inflation valve in the rim. More particularly, the invention relates to a new combination of a tubeless tire with a sidewall valve.

In tubeless tires, the use of a rubber inflation valve in the sidewall of the tire instead of the customary rim valve is often desired. In the manufacture of tubeless tires embodying such valves, it is customary to form an annular passage in the sidewall of the tire by placing a metal mandrel against the sidewall of the tire mold and allowing the mandrel to penetrate the sidewall cord body and the inner liner of the tire as the tire is vulcanized and molded. The mandrel forms a passage between the inside and the outside of the tire through which a valve is inserted.

One difficulty of this method of forming the passage is the fact that the mandrel, in punching its way through the hot, soft rubber forces the cords of the body of the tire, particularly those nearest the band ply, inwardly towards the air chamber so that in the finally vulcanized tire the cords around the inner opening of the passage lead up from the tire carcass toward the air chamber of the tire. In some instances these cords are exposed to the inflation air of the tire, with the result that air is wicked into remote portions of the tire along the cords to cause tire failure.

The present invention is directed to the solution of this problem and to the provision of an improved tubeless tire sidewall, valve and tire combination. The problems of the prior art are overcome by providing a hump or mound of rubber over the inner opening of the passage formed in the sidewall of the tire.

It is, therefore, an object of the invention to provide an improved tubeless tire mounting a sidewall valve. It is a further object of the invention to provide means for preventing inflation air from entering a tubeless tire body. It is yet a further object of the invention to provide a rubber member on the tire inner liner for preventing the escape of air into the tire body from the air chamber in the vicinity of the sidewall valve of the tubeless tire.

These and other objects of the invention will be more readily understood with reference to the specification, claims and drawings of which:

Fig. 1 is a section view of a tubeless tire of the invention mounted on a wheel rim.

Fig. 2 is an enlarged fragmentary section view of a tire sidewall valve assembly of the prior art.

Fig. 3 is an enlarged fragmentary sectional view of the tire sidewall of the invention shown in cooperation with a tire mold, curing bag and mandrel for forming the valve hole.

Fig. 4 is a view of the rubber sidewall valve used in the invention.

Fig. 5 is an enlarged fragmentary sectional view of the preferred form of the invention and Fig. 6 shows one modification of the invention.

Referring to Fig. 1, a tubeless tire, generally indicated at 5, is comprised of a rubberized fabric body portion 2, terminating at each edge in annular beads 3 and 4, and capped with a rubbery tread portion superimposed and bonded as by vulcanization thereto. The tread portion extends down the outside of the tire to merge into sidewall 6, while the inner-peripheral surface of the inside of the tire is covered with the rubbery air impervious innerliner portion 7. Beads 3 and 4 are mounted on flanges 13 and 14 respectively of rim 12, and provision is made for inflation of the tire through inflation valve 8. The rim does not bear an inflation valve, but this is not critical, since the invention will function satisfactorily with or without a rim valve.

In the conventional manner of forming a hole for the valve 8 in the sidewall of the tire, a mandrel 20 mounted in mold 42 (Fig. 3) is forced against the sidewall of the hot, soft tire during vulcanization to penetrate and form a passage from the outside to the inside thereof. Referring to Fig. 3, the passage through the sidewall has walls 27, which are generally complementary to the configuration of the mandrel, 20. A disadvantage of the prior art has been the fact that the mandrel 20, in piercing the sidewall of the tire, forces the cords 25 inwardly toward the band ply. As shown in Fig. 3 the cords are pushed into and through the inner-liner until they are exposed to the air cavity of the tire. This condition exists because during vulcanization of the tire the inner-liner 7, the sidewall 6, and the rubbery material 26 with which the cords are rubberized, become soft and flowable and are distended, as the mandrel is forced into the sidewall of the tire. When the tire is inflated, air from the cavity of the tire enters cords 25 which protrude from the surface of the inner-liner around the peripheral surface of walls 27, of the passage and wicks into remote portions of the tire. This air oxidizes the rubber during operation of the tire and causes failure.

Referring to Fig. 4, a rubber sidewall valve generally indicated at 8 is shown comprised of outer flange 36 and an inner flange 37, separated by reduced portion 38, and provided with a shank 39. For the inflation of the tire by an air chuck an air passage 40 pierces the valve from the outer surface of the outer flange through portion 38, inner flange 37, to communicate with the outside of the shank 39. This valve, of conventional structure, is thrust into the molded hole in the sidewall of the tire and pulled therethrough by the operator grasping the shank 39 and pulling inwardly with respect to the tire wall until the valve attains the position shown in Fig. 2. The diameter of the outer flange 36 is slightly greater than its seat in the sidewall of the tire, while the diameter of the portion 38 is greater than the diameter of its seat in the fabric body portion of the tire. Also, the longitudinal extent or height of the portion 38 is less than the thickness of the sidewall of the tire, so that when the valve 8 is pulled through the hole, the portion 38 will be extended or put under tension with the result that outer flange 36 will be snapped into its seat in the sidewall, and the inner flange 37 will be pulled completely through the hole to the inner surface of the tire. When the valve is released, the portion 38 will tend to recover its original length and diameter with the result that the outer and inner flanges 36 and 37, respectively, will firmly seat under compression against the outer and inner surfaces of the tire respectively. (Since the diameter of the portion 38 in its seated position is greater than that of the hole, that portion will be under compression when seated.) This structure provides a seal around the peripheral surface of the flange 36 as well as on the inner face of that flange. A further seal is attained around the peripheral surface of the portion 38 against the tire fabric body portion 2, while the flange 37 also is under compression to bring its flat surface in sealing contact with the surface of the inner liner 7.

Although this structure is satisfactory in some respects, and for short service life of the tire, it has been found that air from the cavity of the tire, when the tire is inflated to a pressure on the order of 25 to 50 p.s.i. seeps under the inner flange 37, enters the cords 25 of the rubberized fabric body, and is piped into remote portions of the tire to cause failure. It is to eliminate the deleterious effect of this wicking that the present invention is directed.

In view of the present invention, an extra thickness of rubber is provided on the surface of the inner liner, around the peripheral edge of the opening of the molded hole. Referring to Fig. 5, it will be seen that a circular, unvulcanized rubber member 30, having a substantial thickness is centered over the molded hole in the sidewall of the tire. The rubber composition from which this member is formed is preferably not highly vulcanized when applied and, in fact, in the preferred form of the invention an unvulcanized patch of suitable composition is used which has a rate of cure such that an air cure is attained as the tire is run. The patch is then pierced in the center to provide a communicating passage with the molded hole in the tire sidewall and when the valve 8 is pulled through the sidewall hole and the hole in the patch, the relatively unvulcanized rubber of the member 30 parts sufficiently to allow the valve to protrude into the inside of the tire as shown in Fig. 5. Because of its resilient nature, the rubber of the patch clings to the sidewall-inner liner of the tire to impress an air seal there against. The portion 38 of the valve is under tension as well as compression and that brings the flat surface of flange 37 back against the surface of the patch so that a seal is provided between the member 30 and the valve at the face of the flange 37. The cords 25 of the body portion are covered with the extra thickness of rubber and protected from the inflation air of the tire cavity.

In the form of the invention shown in Fig. 6, additional thickness 50 has been provided on the inner liner 7 of the tire in the area thereof adjacent to the opening of the molded hole. Such a structure may be manufactured by "dishing out" the air bag adjacent the opening of the passage to provide a place for an additional thickness of inner liner to flow. The air bag and the passage-forming mandrel 20 are then registered within the tire mold before vulcanization of the tire. The mandrel pierces the tire to form a passage having an opening in the increased thickness of inner liner (Fig. 6). In a second step the inner liner is pierced at the raised portion after tire vulcanization to provide a passage communicating between the inside of the tire and the molded opening in the sidewall.

What is claimed is:

1. The combination of a sidewall valve and a tire having a C-shaped wall comprised of a rubberized fabric sheet terminating at its edges in two annular beads with a rubber sidewall superimposed on and bonded to the radial outer surface of said body and a rubbery air impervious inner liner sheet covering the inner surface of said fabric sheet from bead to bead, a valve seat forming a passage extending through said wall to provide communication between the inside and the outside of the tire, a valve mounted on said seat and pneumatically sealed against the surfaces thereof and having a fluid passage longitudinally extending therethrough to provide fluid communication between the inside and the outside of the tire, and a second rubbery valve seat adhered to said inner liner around the inner opening of said seat and covering the edges of the opening defining said passage on the inside of the tire to frame the opening of the passage inside the tire whereby to protect the fabric of said sheet adjacent said opening from the effects of inflation air.

2. The combination of a sidewall valve assembly and a tire having a C-shaped wall comprised of a rubberized fabric sheet terminating at its edges in two annular beads with a rubbery sidewall superimposed on and bonded to the radial outer surface of said body and a rubbery air impervious inner liner sheet covering the inner surface of said fabric sheet from bead to bead, a valve seat forming a passage extending through said wall to provide communication between the inside and the outside of the tire, a valve mounted on said seat and pneumatically sealed against the surfaces thereof and having an air passage extending longitudinally therethrough and adapted to communicate between the inside and the outside of the tire but to be closed when the valve is mounted in the tire, said inner liner having an increased thickness of rubber adjacent to the inner opening of said seat to frame the edges of the opening defined by said seat on the inside of the tire to protect the fabric of said sheet from the effects of inflation air.

3. The combination of a sidewall valve assembly and a tire having a C-shaped wall comprised of a rubberized fabric sheet terminating at its edges in two annular beads with a rubbery sidewall superimposed on and bonded to the radial outer surface of said body and a rubbery air impervious inner liner sheet covering the inner surface of said fabric sheet from bead to bead, a valve seat forming a passage extending through said wall to provide communication with the inside and the outside of the tire, a valve mounted on said seat and pneumatically sealed against the surfaces thereof and having an air passage longitudinally extending there-through to communicate between the inside and the outside of the tire, and a second rubbery valve seat adhered to said inner liner around the inner opening of said first seat, said valve seat comprising a circular rubber disc having an axial hole aligned with said passage and having thickness at said center greater than the thickness at the outer edge whereby the edges of the opening defined by said seat on the inside of the tire are framed in rubber to protect the fabric of said sheet adjacent said opening from the effects of inflation air.

4. The combination of a sidewall valve and a tire having a C-shaped wall comprised of a rubberized fabric sheet terminating at its edges in two annular beads with a rubbery sidewall superimposed on and bonded to the radial outer surface of said body and a rubbery air impervious inner liner sheet covering the inner surface of said fabric sheet from bead to bead, a valve seat defining a passage extending through said wall and communicating with the inside and outside of the tire, a valve plug mounted on said seat pneumatically sealed against the surfaces thereof and having an air passage longitudinally extending there-through to communicate with the inside and the outside of the tire, and a second rubbery valve seat on the inner surface of said inner liner around the inner opening of said seat, whereby the edges of the opening defined by said seat on the inside of the tire are framed in rubber to protect the cords of said body adjacent said opening from the effects of the inflation air, said valve having an inner flange of greater diameter than the diameter of the hole formed by the walls of said valve seat and having a flat face adapted to seat against said second rubber valve seat when said valve is mounted on said first valve seat.

References Cited in the file of this patent

UNITED STATES PATENTS

| | | |
|---|---|---|
| 670,725 | Pickett | Mar. 26, 1901 |
| 1,245,838 | Wallace | Nov. 6, 1917 |
| 2,161,775 | Miller et al. | June 6, 1939 |
| 2,318,115 | Tubbs | May 4, 1943 |
| 2,634,785 | Tubbs | Apr. 14, 1953 |
| 2,769,476 | Herzegh et al. | Nov. 6, 1956 |

OTHER REFERENCES

Publication: "Tires, TBA Merchandising," June 1956, page 47.